(12) United States Patent
Dou et al.

(10) Patent No.: US 11,140,341 B2
(45) Date of Patent: Oct. 5, 2021

(54) CAMERA MODULE AND MOBILE TERMINAL HAVING THE CAMERA MODULE

(71) Applicant: BEIJING XIAOMI MOBILE SOFTWARE CO., LTD., Beijing (CN)

(72) Inventors: Zifei Dou, Beijing (CN); Yuelin Wu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/854,420

(22) Filed: Apr. 21, 2020

(65) Prior Publication Data

US 2021/0075981 A1 Mar. 11, 2021

(30) Foreign Application Priority Data

Sep. 9, 2019 (CN) .......................... 201910848993.0

(51) Int. Cl.
*H04N 5/355* (2011.01)
*G03B 9/08* (2021.01)
*H04N 5/372* (2011.01)
*H04N 5/374* (2011.01)

(52) U.S. Cl.
CPC .............. *H04N 5/355* (2013.01); *G03B 9/08* (2013.01); *H04N 5/372* (2013.01); *H04N 5/374* (2013.01)

(58) Field of Classification Search
CPC ........ H04N 5/355; H04N 5/372; H04N 5/374; H04N 5/3415; H04N 5/2254; G03B 9/08; G03B 35/02; G03B 37/04; G03B 19/22; G03B 17/17
See application file for complete search history.

(56) References Cited

U.S. PATENT DOCUMENTS

| | | | | |
|---|---|---|---|---|
| 9,681,057 | B2* | 6/2017 | Attar | H04N 5/265 |
| 2003/0020958 | A1* | 1/2003 | Bean | H04N 5/374 |
| | | | | 358/302 |
| 2008/0025571 | A1* | 1/2008 | Nakao | H04N 5/3415 |
| | | | | 382/107 |

(Continued)

FOREIGN PATENT DOCUMENTS

| | | |
|---|---|---|
| WO | 2018094928 A1 | 5/2018 |
| WO | 2018149488 A1 | 8/2018 |

OTHER PUBLICATIONS

Extended European Search Report in Application No. 20182288.9, dated Dec. 14, 2020.

*Primary Examiner* — Chiawei Chen
(74) *Attorney, Agent, or Firm* — Syncoda LLC; Feng Ma

(57) ABSTRACT

A camera module includes: a plurality of lenses; an image sensing component disposed on an imaging side of the plurality of lenses, and an area of a photosensitive region of the image sensing component is greater than an area of actual imaging region of a single lens and less than the sum of the area of actual imaging region of each of the lenses; and a plurality of optical switch components, disposed, between the plurality of lenses and the image sensing component, corresponding to the plurality of lenses, wherein the optical switch component is controlled to switch between an on state and an off state, and neighboring optical switch components corresponding to neighboring lenses whose actual imaging regions overlap each other are not turned on at the same time.

20 Claims, 7 Drawing Sheets

(56) References Cited

U.S. PATENT DOCUMENTS

| | | | |
|---|---|---|---|
| 2009/0174765 A1* | 7/2009 | Namba | H04N 13/232 348/46 |
| 2010/0013906 A1 | 1/2010 | Border et al. | |
| 2011/0176020 A1* | 7/2011 | Chang | G03B 17/12 348/222.1 |
| 2012/0019713 A1* | 1/2012 | Gudlavalleti | G03B 15/05 348/366 |
| 2014/0139427 A1* | 5/2014 | Hirai | H04N 13/302 345/156 |
| 2018/0077322 A1* | 3/2018 | Melakari | H04N 5/23229 |
| 2018/0115692 A1* | 4/2018 | Du | H04N 5/23245 |

* cited by examiner

CAMERA MODULE AND MOBILE TERMINAL HAVING THE CAMERA MODULE

CROSS-REFERENCE TO RELATED APPLICATIONS

The present application claims the priority to Chinese patent application number of 201910848993.0 filed on Sep. 9, 2019, the disclosure of which is hereby incorporated by reference in its entirety.

BACKGROUND

In order to improve the captured picture quality or obtain diversified capturing effects, current mobile terminals (such as mobile phones or tablet computers, etc.) are generally equipped with a plurality of cameras, such as two, three, four or even a dozen cameras. In the camera modules of these mobile terminals, a form of an image sensing component, such as a complementary metal-oxide-semiconductor (CMOS) image sensor, and a lens, is employed. Generally, a mobile terminal may need as many sets of lenses and image sensing components as the number of cameras it possesses, so that a user can select a variety of different cameras to achieve the desired capturing effect.

SUMMARY

The present disclosure relates generally to the technical field of mobile terminals, and more specifically to a camera module, and a mobile terminal having the camera module.

The camera module and the mobile terminal having the camera module according to various embodiments of the present disclosure can effectively reduce the total space occupied by the camera, reduce cost of the mobile terminal, and improve imaging quality.

According to a first aspect of embodiments of the present disclosure, there is provided a camera module, including:

a plurality of lenses;

an image sensing component, disposed on an imaging side of the plurality of lenses, and an area of a photosensitive region of the image sensing component being greater than an area of actual imaging region of a single lens and less than the sum of the area of actual imaging region of each of the lenses; and a plurality of optical switch components, disposed, between the plurality of lenses and the image sensing component, corresponding to the plurality of lenses;

wherein the optical switch component is controlled to switch between an on state and an off state, and neighboring optical switch components corresponding to neighboring lenses whose actual imaging regions overlap each other are not turned on at the same time.

In some implementations of the present disclosure, the plurality of lenses are arranged linearly.

In some implementations of the present disclosure, the plurality of lenses are arranged in a matrix.

In some implementations of the present disclosure, the neighboring lenses are directly imaged onto the image sensing component, and the actual imaging regions of the neighboring lenses are overlapped with each other.

In some implementations of the present disclosure, in an image capturing operation, the plurality of optical switch components are controlled to be turned on sequentially and successively so as to be imaged sequentially and successively on the image sensing component.

In some implementations of the present disclosure, in an image capturing operation, the optical switch component corresponding to the lens with no overlap in the actual imaging region is controlled to be turned on so as to be imaged simultaneously on the image sensing component.

In some implementations of the present disclosure, the image sensing component is one of a charge-coupled image sensor and a metal oxide semiconductor image sensor.

In some implementations of the present disclosure, the optical switch component is a micro-electromechanical system (MEMS) shutter.

According to a second aspect of the embodiments of the present disclosure, a mobile terminal is provided. The mobile terminal includes: any one of the camera modules described above; and a processor that controls the plurality of optical switch components to switch between an on state and an off state, and neighboring optical switch components corresponding to neighboring lenses whose actual imaging regions overlap each other are not turned on at the same time.

In some implementations of the present disclosure, a front camera and/or a rear camera of the mobile terminal can be part of the camera module, or include the camera module.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Description will now be made herein in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. In contrast, they are merely examples of devices and methods consistent with some aspects related to the disclosure as recited in the appended claims.

A plurality of camera modules may occupy a larger space in the body of a mobile terminal. Moreover, due to cost considerations, the qualities of the image sensing components selected in different camera modules are different, and usually only the main lens is equipped with a high-quality image sensing component, which results in that photo/video quality of the mobile terminal has large variations.

In addition, in order to obtain a larger capturing angle, the mobile terminals usually need to separately add a set of ultra-wide-angle lenses and image sensing components. However, such a single set of ultra-wide-angle camera modules is usually difficult to achieve both quality and cost. Moreover, since ultra-wide-angle lenses usually have wide-angle distortion, it is difficult to make the camera field of view (FOV) of a general mobile terminal very large to prevent the distortion at the edges from being too heavy and seriously affecting the imaging effect.

Figure 1A:
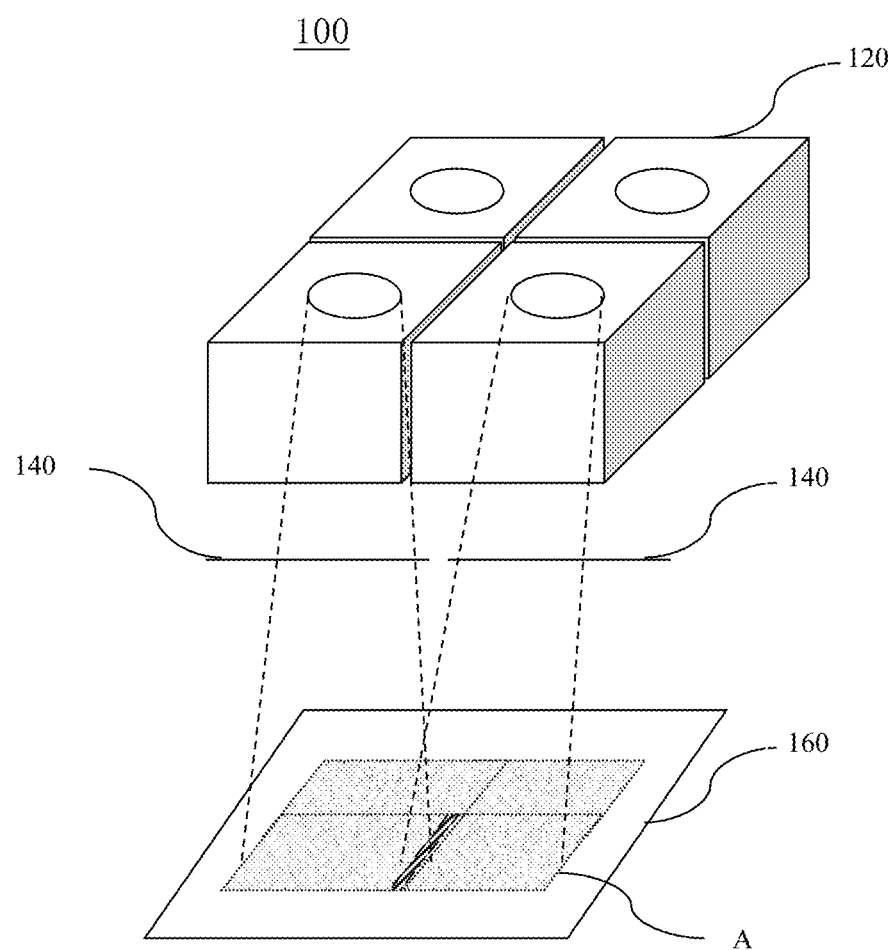
FIG. 1A is a schematic diagram of a camera module according to some embodiments of the present disclosure.
Figure 1B:
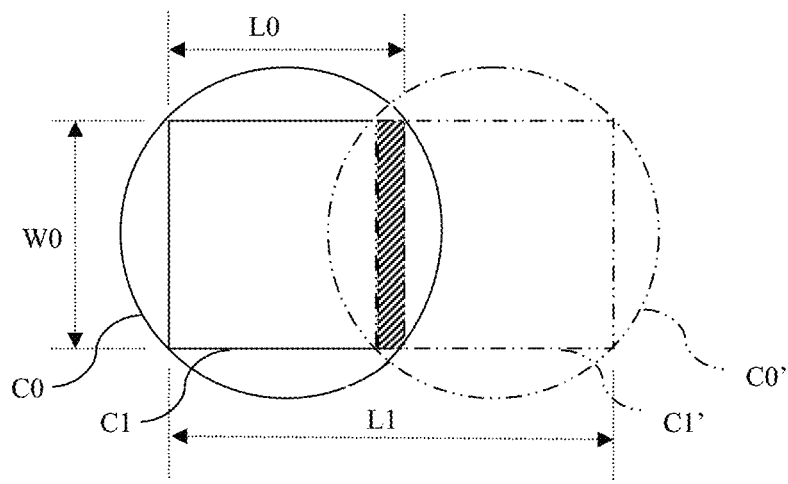
FIG. 1B is a schematic diagram showing a relationship between a lens imaging and an image sensing component in a camera module according to some embodiments of the present disclosure.
Figure 1C:
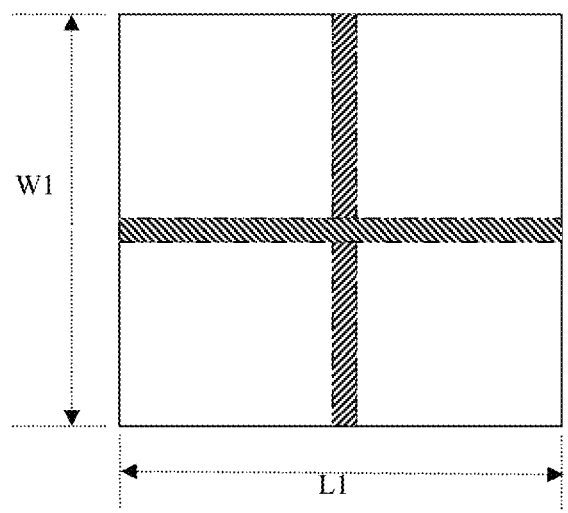
FIG. 1C is a schematic diagram of a photosensitive region of an image sensing component of a camera module according to some embodiments.

FIG. 1A is a schematic diagram of a camera module according to some embodiments of the present disclosure. FIG. 1B is a schematic diagram showing a relationship between a lens imaging and an image sensing component in a camera module according to some embodiments of the present disclosure. FIG. 1C is a schematic diagram of a photosensitive region of an image sensing component of a camera module according to some embodiments.

As shown in FIG. 1A, the camera module 100 includes a plurality of lenses 120, an image sensing component 160, and a plurality of optical switch components 140. In FIG. 1A, the camera module 100 has four lenses 120, but the present disclosure is not limited thereto, and the number of the lenses 120 may be two, three, or more. Each lens 120 has separate components (not shown) such as a lens holder, a motor, an optical filter and so on; or all lenses 120 have common components (not shown) such as a lens holder, a motor, a filter and so on to reduce the distance between the lenses 120 and facilitate the simplified assembly and relative positioning of the plurality of lenses.

In FIG. 1A, the plurality of lenses 120 are arranged in a matrix type, but the present disclosure is not limited thereto, and the plurality of lenses may also be arranged linearly (to be described below in conjunction with FIG. 3). This arrangement is beneficial to reduce the distance between the lenses and facilitate the relative positioning of the plurality of lenses.

The image sensing component 160 is disposed on the imaging side of the plurality of lenses 120. The area of the photosensitive region A of the image sensing component 160 is greater than the area of actual imaging region of the single lens 120 and less than the sum of the areas of actual imaging regions required by the respective lenses 120. Therefore, as shown in FIG. 1A, FIG. 1B, and FIG. 1C, the actual imaging regions C1 and C1' formed by imaging the adjacent or neighboring lenses 120 onto the image sensing component 160 overlap each other (the overlapping portions being shown by diagonal shading in the figure) to save the area of the photosensitive region of the image sensing component.

FIG. 1B illustrates the relationship between the lens imaging and the image sensing component in detail. The circle C0 is the illumination region of a lens. The rectangle C1 is a photosensitive region corresponding to a lens 120 in the image sensing component 160, that is, the rectangle C1 is an actual imaging region of a lens. The area of rectangle C1 is W0*L0. The circle C0' is the illumination region of the adjacent lens, and the rectangle C1' is the photosensitive region corresponding to the adjacent lens in the image sensing component 160, that is, the rectangle C1' is the actual imaging region of the adjacent lens. The area of the rectangle C1' is also W0*L0. In order to achieve the effect of saving the image sensing component, the actual imaging region C1' of the adjacent lens with the illumination region C0' and the actual imaging region C1 of the adjacent lens with the illumination region C0 overlap each other (as shown by the diagonal shading in the figure), the area of the overlapping region is W0*(2L0-L1), where L1<2L0. That is, in the case that other conditions are the same, the area of the photosensitive region of the image sensing component can save at least the area W0*(2L0-L1), in the camera module with two lenses according to the present disclosure.

Based on the above description in conjunction with FIG. 1B, it can be understood that, as shown in FIG. 1C, the four lenses 120 corresponding to the matrix arrangement of FIG. 1A, both the two sides of the actual imaging region corresponding to each lens are overlapped with the actual imaging regions of the adjacent lenses from each other, respectively (as shown by the diagonal shading in the figure). That is, in the case that the other conditions are the same, the area of the photosensitive region of the image sensing component can save at least the area W1*L1-W0*L0, in the camera module with four lens of the present disclosure as shown in FIG. 1A, where L1<2L0, W1<2W0, and W0, W1, L0, and L1 are all positive numbers.

In these embodiments, there may not be provided, between the plurality of lenses 120 and the image sensing component 160, an optical element that guides the light passing through the lens to reflect or refract, that is, the light of the lens 120 can be directly imaged onto the image sensing component 160, and the actual imaging regions of the adjacent lenses 120 are allowed to overlap each other.

The image sensing component 160 can be a charge coupled device (CCD) or a complementary metal oxide semiconductor (CMOS) image sensor. The size and shape of the image sensing component 160 can be designed and adjusted according to the number, type, and arrangement of the lenses so that the area of the photosensitive region of the image sensing component 160 is less than the sum of the areas of actual imaging regions required by each lens 120, and thus the actual imaging regions formed by imaging the adjacent lenses 120 onto the image sensing component 160 overlap each other (the overlapping portions being shown by diagonal shading in the figure), so as to save the area of the photosensitive region of the image sensing component, and achieve the effects of reducing the occupied space and saving the costs.

The plurality of optical switch components 140 are disposed between the plurality of lenses 120 and the image sensing component 160 and are in one-to-one correspondence with the plurality of lenses 120. Each optical switch component 140 is controlled to switch between an on state and an off state, and the adjacent optical switch components corresponding to the adjacent lenses whose actual imaging regions overlap each other are not turned on at the same time.

As shown in FIG. 1A, the actual imaging regions of the four lenses 120 arranged closely in a matrix are all overlapped, and when one of the four lenses 120 is in the on state, the remaining optical switch components are in the off state, so that only the lens corresponding to the turned-on optical switch component is imaged on the photosensitive region of the image sensing component. Therefore, each lens can be equipped with a larger photosensitive area as much as possible in a common image sensing component, thereby improving the imaging quality.

In the present disclosure, the optical switch component is an optical physical element capable of controlling whether or not the light passing through the lens is irradiated onto the image sensing component. The optical switch component 140 can be a controlled mechanical shutter, such as a micro-electromechanical system (MEMS) shutter, which is turned on and off after receiving a control signal from a processor (to be described below in conjunction with FIG. 8) to control whether or not the light passing through the lens 120 is illuminated onto the image sensing component 160. The optical switch component 140 can also be any kind of physical shutter or optical shutter capable of receiving a control signal of the processor and controlling whether or not the light passing through the lens is irradiated onto the image sensing component.

In the above-mentioned embodiments of the present disclosure, since the plurality of lenses 120 and the image sensing component 160 are arranged in the foregoing manner, the actual imaging region of each lens 120 on the image sensing component 160 may overlap to some extent. If these lenses 120 are imaging at the same time, there may be a problem of mutual interference between the images. For this reason, by adding an optical switch component 140 to each lens 120, only the optical switch component 140 of the lens 120 which is called and in the working state is in the on state, and the optical switch components on the remaining lenses are all in the off state. Therefore, interference problems caused by overlapping of actual imaging regions of the plurality of lenses on the same image sensing component can be avoided.

For the camera module 100 of the present disclosure, after assembling the plurality of lenses 120, the plurality of optical switch components 140, and a single image sensing component 160, it is required to perform the calibrating and demarcating operations to determine that each lens 120 can be imaged onto a predetermined actual imaging region on the image sensing component 160, and corresponding debugging is performed. When the camera module 100 of the present disclosure is in use and it is desired to call a lens 120, the corresponding optical switch component 140 of the lens is turned on, and the corresponding photosensitive region on the image sensing component 160 is activated. In an image capturing operation by the user, a plurality of optical switch components 140 can be controlled to be sequentially turned on, in order to image on the image sensing component 160 sequentially and successively. Alternatively, during an image capturing operation, a part of the plurality of optical switch components 140 (that is, the optical switch components corresponding to lenses with no overlap in the actual imaging region) is controlled to be turned on (it will be described below in conjunction with FIG. 3), and imaged on the image sensing component simultaneously.

Figure 2A:
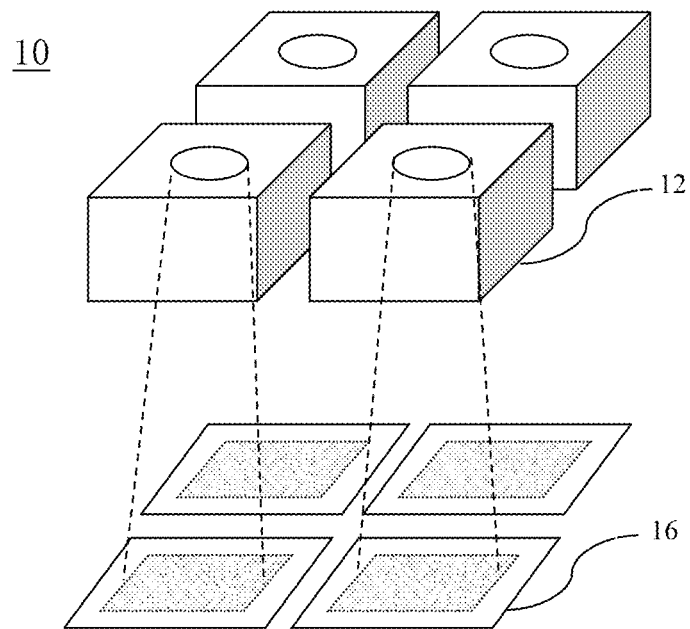
FIG. 2A is a schematic diagram of a camera module according to an example for comparison.
Figure 2B:
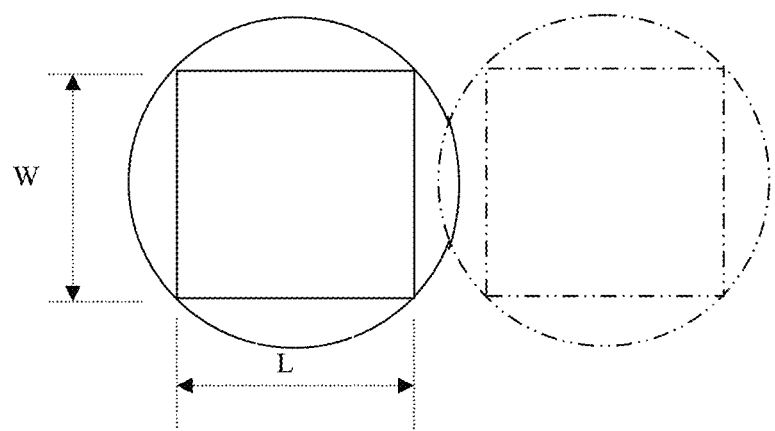
FIG. 2B is a schematic diagram showing a relationship between lens imaging and an image sensing component in a camera module according to some embodiments.

FIG. 2A is a schematic diagram of a camera module according to an example for comparison. FIG. 2B is a schematic diagram showing a relationship between a lens imaging and an image sensing component in a camera module according to some embodiments. As shown in FIGS. 2A and 2B, the camera module 10 includes a plurality of lenses 12 and an image sensing component 16 in one-to-one correspondence with the plurality of lenses 12. The plurality of lenses 12 are arranged loosely, and the actual imaging regions of the adjacent lenses 12 on the image sensing component 16 do not overlap with each other. Each lens 12 and the image sensing component 16 are controlled by the electronic optical switch component to form relatively independent images without interferences between the images. However, such a camera module 10 occupies a larger internal space as a whole, thereby limiting the degree of freedom in designing the back of the mobile terminal. In addition, the area of the photosensitive region of the image sensing component (W*L, where W<W0, L<L0) is limited, and due to the cost considerations, the image sensing component usually used in lenses other than the main camera is generally weaker or far weaker than that of the main camera, which affects the final imaging quality.

It can be seen that, in the camera module of these embodiments, because the area of the photosensitive region of the image sensing component is greater than the area of actual imaging region of a single lens and less than the sum of the areas of actual imaging regions of respective lenses, that is, the actual imaging regions of part of the lenses can overlap with each other, thereby allowing the lens arrangement more closely, occupying less internal space, and allowing the higher degree of freedom in designing the back of the mobile terminals that use the camera module. Secondly, the area of the photosensitive region of the image sensing component shared by the plurality of lenses is less than the sum of the areas of actual imaging regions required by the respective lenses, thereby reducing the total photosensitive region of the image sensing component, not only saving the space occupied, but also reducing the cost. In addition, each lens can be equipped with a larger photosensitive area (W0*L0>W*L) as much as possible in the common image sensing component, or a better image sensing component (for example, with a lower signal-to-noise ratio) is selected for the common image sensing component to improve imaging quality.

Figure 3:
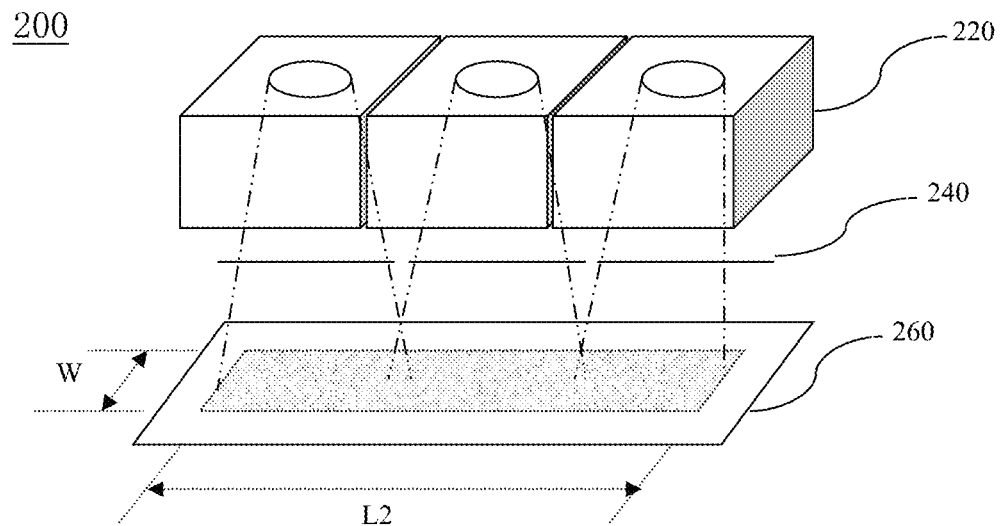
FIG. 3 is a schematic diagram of a camera module according to another exemplary embodiment.

FIG. 3 is a schematic diagram of a camera module according to another exemplary embodiment. The difference from the embodiments shown in FIG. 1A to FIG. 1C lies in that there are, in the camera module 200 of the embodiment shown in FIG. 3, three linearly arranged lenses 220, and the area of the photosensitive area of the image sensing component 260 is greater than the actual imaging region of a single lens 220 and less than the sum of the areas of actual imaging regions of the three linearly arranged lenses 220. That is, in these embodiments, the intermediate lenses can overlap with the actual imaging regions corresponding to the adjacent lenses on both sides. The total area of the photosensitive region of the image sensing component is W0*L2, where L2<3L0. In the case that the other conditions are the same, as compared with the solution that one lens is equipped with one image sensing component, the total area of the photosensitive regions of the image sensing component in the camera module according to these embodiments can save at least the area W0*(3L0-L2).

In an image capturing operation by the user, a plurality of optical switch components 220 can be controlled to be turned on sequentially and successively to form images on the image sensing component 260 sequentially and successively. Alternatively, in an image capturing operation, a part of the plurality of optical switch components 220 (that is, the optical switch components corresponding to the lenses with no overlap in the actual imaging regions, such as the optical switch components corresponding to the two lenses at the left and right ends) is controlled to be turned on, and imaged on the image sensing component 260 simultaneously.

Figure 4:
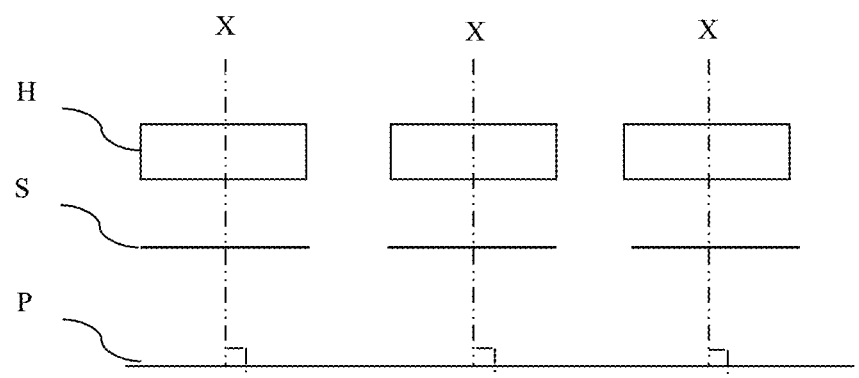
FIG. 4 is a schematic diagram showing a positional relationship between a lens and an imaging plane in a camera module according to some embodiments.

FIG. 4 is a schematic diagram showing a positional relationship between a lens and an imaging plane in a camera module according to some embodiments. The structural schematic diagram of the camera module shown in FIG. 4 can refer to FIG. 3 accordingly, in which a plurality of lenses in the camera module are arranged linearly.

As shown in FIG. 4, in the camera module, the optical axis X of each lens H (e.g., 120, 220) is perpendicular to the plane P (that is, the photosensitive plane) where the photosensitive region of the image sensing component is located. The light passing through each lens H passes through the optical switch component S (e.g., 140, 240) at the shortest distance to reach the photosensitive plane P of the image sensing component.

In the embodiment shown in FIG. 4, in order to achieve different capturing (photo/video) effects, the diverse combination way of the lenses in the camera module can be as follows:

1) To Enhance the Capturing Quality

The performance parameters of the plurality of lenses H are the same. In an image capturing operation, the plurality of optical switch components S are controlled to be turned on successively, so that the light of the lens H is imaged on the photosensitive plane P of the image sensing component sequentially and successively.

In these embodiments, since the parameters of the lenses are the same and the lenses are arranged closely (as described above), the perspective ranges of the respective lenses are highly overlapped, so that the image fusion technology can be utilized to perform the fusion operation on the overlapping regions of sequentially imaged pictures. As a result, not only a high-quality picture can be obtained, but also depth-of-field data information can be acquired.

2) To Achieve Diversification of Functions

The plurality of lenses H adopt respectively different performance parameters, for example, different focal lengths (such as macro and telephoto), different apertures, and different viewing angles (such as wide-angle, ultra-wide-angle). The combination way can be, for example, a four-shot combination of an ultra-wide-angle lens, a telephoto lens, a main lens, and a blur lens; or a three-shot combination of a color lens, a black-and-white lens, and a telephoto lens; or a three-shot combination of a wide-angle lens, a telephoto lens, and a color lens; and so on.

In these embodiments, there may not be provided between the lens and the image sensing component, an optical element that guides light passing through the lens to reflect or refract, that is, the light from the lens can be directly imaged onto the image sensing component, and the actual imaging regions of adjacent lenses are allowed to be overlapped with each other.

In these embodiments, since the actual imaging regions, which are formed by the adjacent lenses imaged directly onto the image sensing component, overlap with each other (as described above), the photosensitive region of the image sensing component can be reutilized by the camera module, so that each lens can be imaged onto the same high-quality image sensing component, thereby controlling the costs in the case of diversifying the capturing functions.

Figure 5:
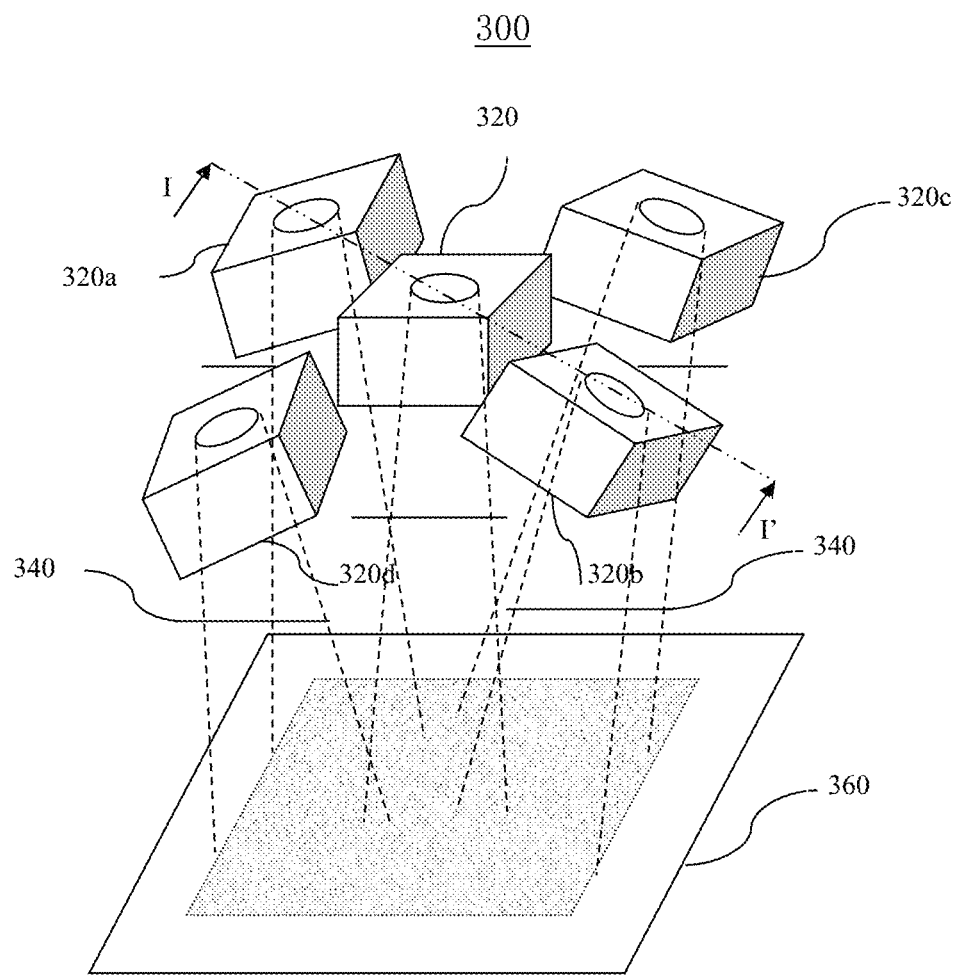
FIG. 5 is a schematic diagram of a camera module according to still another exemplary embodiment.
Figure 6:
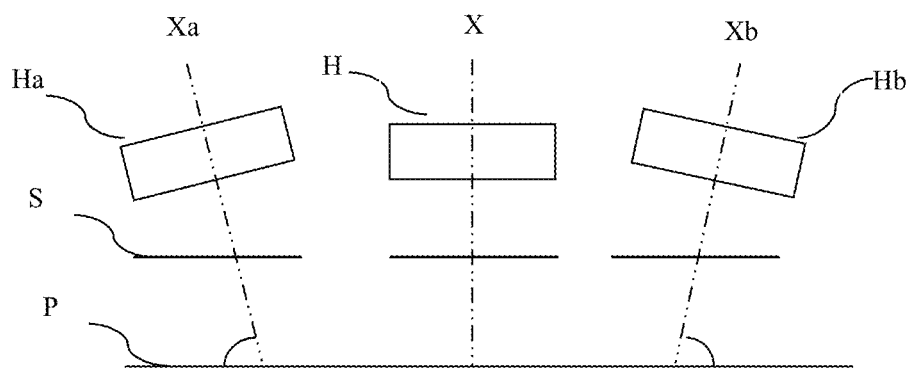
FIG. 6 is a schematic diagram showing the positional relationship between the lens and the imaging plane along the line I-I' in FIG. 5.

FIG. 5 is a schematic diagram of a camera module according to still another exemplary embodiment. FIG. 6 is a schematic diagram showing the positional relationship between the lens and the imaging plane along the line I-I' in FIG. 5. As shown in FIG. 5, the camera module 300 includes a plurality of lenses, an image sensing component 360 and a plurality of optical switch components 340. The plurality of lenses of the camera module 300 includes a main lens 320 and a plurality of sub lenses 320a, 320b, 320c, and 320d. As shown in FIG. 6, the optical axis X of the main lens H (320) is perpendicular to the plane P (that is, the photosensitive plane) where the image sensing component is located, and the optical axes Xa, Xb of the plurality of sub lenses Ha, Hb (320a, 320b) form an angle with the plane P where the image sensing component 360 is located, respectively. The light from each lens passes through the optical switch component S and reaches the photosensitive plane P of the image sensing component.

In these embodiments, a plurality of sub lenses 320a, 320b, 320c, and 320d are disposed around the main lens 320. The plurality of sub lenses 320a, 320b, 320c, and 320d are arranged to be center symmetrical with respect to the main lens 320. In the embodiment shown in FIG. 5, the number of sub lenses is five and the number of main lenses is one, but the present disclosure is not limited thereto, and it is possible that six sub lenses surround one main lens; alternatively, there can be two main lenses, and 6 sub lenses surround the two main lenses.

In these embodiments, as shown in FIG. 6, the optical axes Xa, Xb of each of the sub lenses Ha, Hb (320a, 320b) are mirror-symmetrical with respect to the optical axis X of the main lens H (320), but it is not limited thereto.

In an image capturing operation by the user, the main lens 320 and the respective sub-lenses 320a, 320b, 320c, and 320d are called in turn to capture the plurality of images to be synthesized later with a super wide-angle effect. For example, the corresponding optical switch components are sequentially turned on in a very short time, so that each lens is imaged on a common image sensing component, and then the acquired images are synthesized, thereby achieving an ultra-wide-angle capturing effect. Therefore, the range of the angle of view FOV of the camera module of these embodiments is relatively large, and the wide-angle distortion at the edges can be better controlled. In addition, the same high-quality image sensing component (such as with a lower signal-to-noise ratio) as the main lens is called under the ultra-wide-angle imaging effect, which can effectively improve the imaging quality.

Optionally, in an image capturing operation by the user, the main lens 320 and the respective sub-lenses 320a, 320b, 320c, and 320d can be called separately to take photos or videos at corresponding angles. For example, among the five lenses of these embodiments, it is selected to turning on separately an optical switch component of a sub-lens with a tilted optical axis, to enable the sub-lens to be imaged on a common image sensing component, thereby facilitating the user to achieve photos/videos with different angles without moving a mobile phone. In particular, in some capturing scenes where it is not convenient to place the mobile phone at a specific angle, it is possible to capture the content that cannot be taken by existing ordinary mobile phones without moving the mobile phone.

In an embodiment, the angle formed by the optical axis of the respective sub-lenses 320a, 320b, 320c, and 320d and the plane P where the image sensing component 360 is located can be adjusted. The sub-lenses 320a, 320b, 320c, and 320d can be tilt-shift lens. Therefore, it is easier for the user to adjust the viewing angle range of the camera module according to these embodiments.

In the camera module of these embodiments, by sequentially turning on or separately turning on the optical switch component to call the sub-lens with the tilted optical axis, it can share the same high-quality image sensing component as the main lens, thereby the cost can be reduced under the premise of the same image quality or the image quality can be improved under premise of the same cost.

Figure 7:
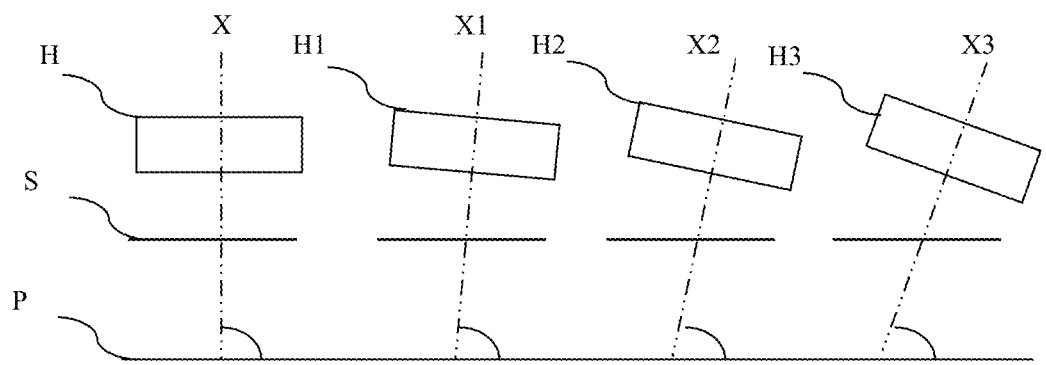
FIG. 7 is a schematic diagram of a positional relationship between a lens and an imaging plane in a camera module according to still another exemplary embodiment.

FIG. 7 is a schematic diagram of a positional relationship between a lens and an imaging plane in a camera module according to yet another exemplary embodiment. The difference from the embodiments shown in FIG. 5 and FIG. 6 lies in that, as shown in FIG. 7, a plurality of lenses are linearly arranged, and the optical axes of the respective sub lenses H1, H2, and H3 are at different angles to the plane P where the image sensing component is located.

In the embodiment of FIG. 7, the plurality of sub lenses H1, H2, and H3 arranged linearly are located on the same side of the main lens H. In addition, the farther the sub-lens from the main lens H, the smaller the angle with the plane P where the image sensing component is located.

In an image capturing operation by the user, the main lens H and the respective sub-lenses H1, H2, and H3 are called in turn to form an image on a common image sensing component, and then the acquired images are synthesized, thereby achieving an ultra-wide-angle capturing effect. Therefore, the range of the angle of view FOV of the camera module of these embodiments is relatively large, and the wide-angle distortion at the edges can be better controlled. Furthermore, the same high-quality image sensing component (such as with a lower signal-to-noise ratio) as the main lens is called under the ultra-wide-angle imaging effect, which can effectively improve the imaging quality.

Optionally, in an image capturing operation by the user, the main lens H and the respective sub lenses H1, H2, and H3 can be called separately so as to take photos or videos at corresponding angles. For example, among the four lenses in these embodiments, it is selected to turn on separately the optical switch component of a sub-lens with the largest tilt of optical axis, so that the sub-lens is imaged on a common image sensing component, thereby facilitating the user to achieve photos/videos with a special angle (such as top or bottom capturing) without moving a mobile phone. In particular, in some capturing scenes where it is not convenient to place the mobile phone at a specific angle, it is possible to capture the content that cannot be taken by existing ordinary mobile phones without moving the mobile phone.

In these embodiments, each of the sub-lenses H1, H2, and H3 can be a tilt-shift lens. Therefore, it is easier for the user to adjust the viewing angle range of the camera module according to these embodiments as needed.

In the camera module of these embodiments, by sequentially turning on or separately turning on the optical switch component to call the sub-lens with the tilted optical axis, it can share the same high-quality image sensing component as the main lens, thereby the cost can be reduced under the premise of the same image quality or the image quality can be improved under premise of the same cost.

Figure 8:
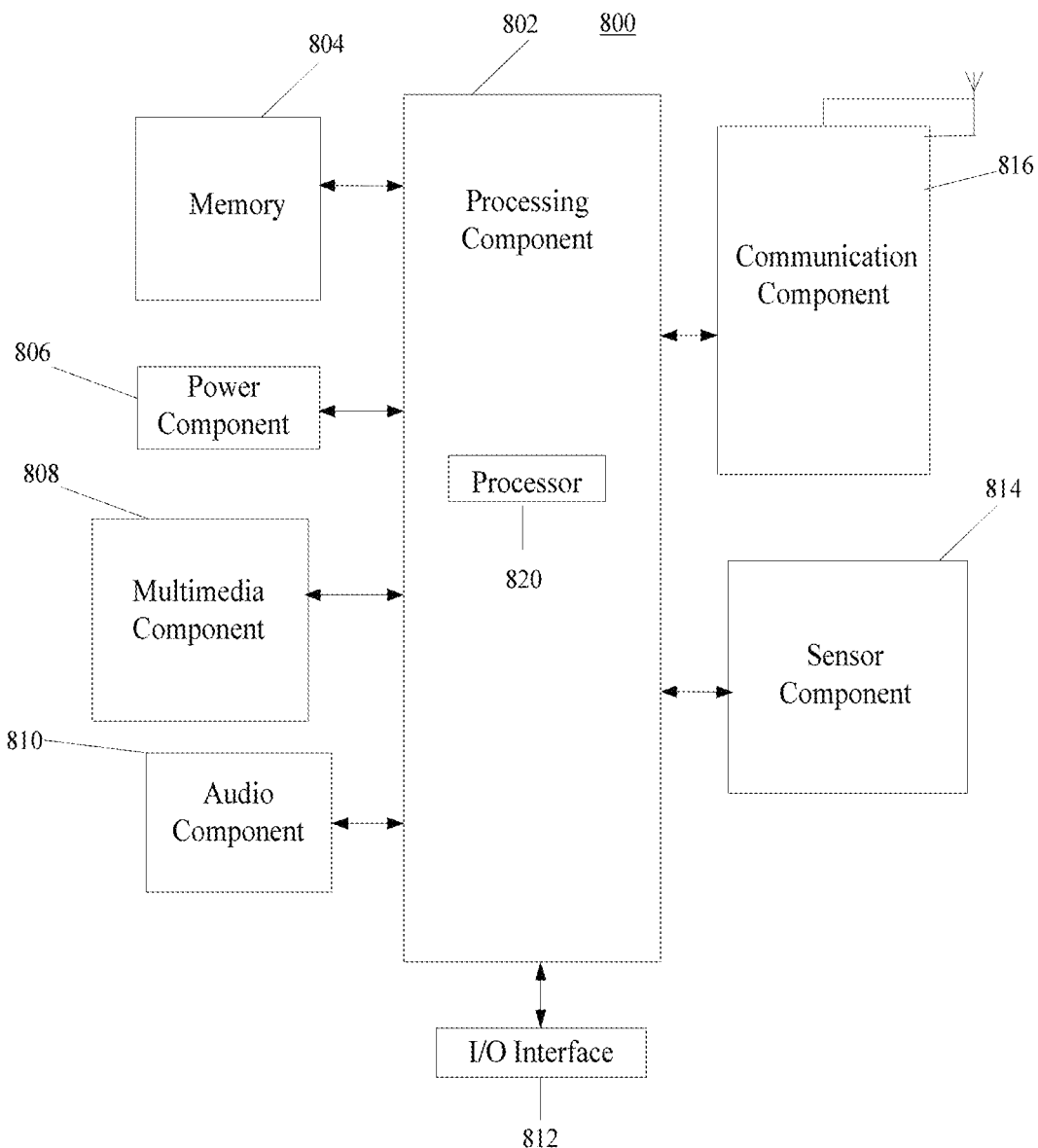
FIG. 8 is a block diagram showing a mobile terminal according to some embodiments.

FIG. 8 is a block diagram showing a mobile terminal 800 according to some embodiments. The mobile terminal 800 is, for example, a smartphone, a tablet, or the like.

Referring to FIG. 8, the mobile terminal 800 can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the mobile terminal 800, such as the operations associated with display, telephone calls, data communications, camera operations, and recording operations. The processing component 802 can include one or more processors 820 to execute instructions to perform all or part of the steps in the above described methods. In particular, the processor 820 controls a plurality of optical switch components of the camera module to switch between a turning on state and a turning off state, and adjacent optical switch components corresponding to adjacent lenses whose actual imaging areas overlap each other are not turned on at the same time. The processor 820 may control one of the optical switch components to be turned on to perform required capturing according to the input selection signal; or the processor 820 may control to sequentially turn on the optical switch components to take pictures, and retrieve the sequentially captured images for synthesis.

Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the mobile terminal 800. Examples of such data include instructions for any applications or methods operated on the mobile terminal 800, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the mobile terminal 800. The power component 806 can include a power management system, one or more power sources, and any other components associated with the generation, management, and distribution of power in the mobile terminal 800.

The multimedia component 808 includes a screen providing an output interface between the mobile terminal 800 and the user. In some embodiments, the screen can include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors not only can sense a boundary of a touch or swipe action, but also can sense a period of time and a pressure associated with the touch or swipe action. In some embodiments, the multimedia component 808 includes a front camera and/or a rear camera. The front camera and the rear camera can receive an external multimedia datum while the mobile terminal 800 is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone ("MIC") configured to receive an external audio signal when the mobile terminal 800 is in an operation mode, such as a call mode, a recording mode, and a voice recognition mode. The received audio signal can be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the mobile terminal 800. For instance, the sensor component 814 can detect an open/closed status of the mobile terminal 800, relative positioning of components such as the display and the keypad, of the mobile terminal 800, a change in position of the mobile terminal 800 or a component of the mobile terminal 800, a presence or absence of user contact with the mobile terminal 800, an orientation or an acceleration/deceleration of the mobile terminal 800, and a change in temperature of the mobile terminal 800. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the mobile terminal 800 and other devices. The mobile terminal 800 can access a wireless network based on a communication standard, such as Wi-Fi, 2G, 3G, 4G, 5G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the mobile terminal 800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the mobile terminal 800, for performing the above-described methods. For example, the non-transitory computer-readable storage medium can be a ROM, a RAM, a CD-ROM, a magnetic tape, a floppy disc, an optical data storage device, and the like.

Various embodiments of the present disclosure can have one or more of the following advantages.

The area of the photosensitive region of the image sensing component can be greater than the area of actual imaging region of a single lens and less than the sum of the areas of actual imaging regions of respective lenses, that is, the actual imaging regions of part of the lenses can overlap each other, thereby enabling the arrangement of the lens more compact, occupying less internal space, and allowing a higher degree of freedom in designing the back of mobile terminals using the camera module.

The area of the photosensitive region of the image sensing component shared by the plurality of lenses can be less than the sum of the areas of the actual imaging regions required by each of the lenses, thereby reducing the total photosensitive region of the image sensing component, which not only saves space occupied but also reduces costs.

In addition, each lens can be equipped with a larger sensing area in the common image sensing component as much as possible, or a higher-quality image sensing component can be selected for the common image sensing component, thereby improving imaging quality.

In an image capturing operation, each lens can be called separately to capture photos or videos at corresponding angles. The optical switch component of a sub-lens with a tilted optical axis can be turned on separately, so that the sub-lens can be imaged on a common image sensing component, and thus the user can achieve photos/videos with a special angle (such as a top or bottom capturing) without moving the mobile phone. In particular, in some capturing scenes where it is not convenient to place the mobile phone at a specific angle, it is possible to capture content that cannot be taken by existing ordinary mobile phones without moving the mobile phone.

In an image capturing operation, the main lens and each sub-lens are called in turn, imaging on a common image sensing component, and then synthesizing the acquired images to obtain an ultra-wide-angle capturing effect. Therefore, the range of the angle of view FOV of the camera module of these embodiments is made relatively large, and the wide-angle distortion at the edges can be better controlled.

By sequentially turning on or separately turning on the optical switch component to call the sub-lens with tilted optical axis, it can be shared with the high-quality image sensing component like the main lens, so as to achieving the reduction of the cost under the premise of the same image quality or the improvement of the image quality under the premise of the same cost.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used to refer to portions of hardware, software, or a combination thereof.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A camera module, comprising:
 a plurality of lenses;
 an image sensing component, disposed at an imaging side of the plurality of lenses, an area of a photosensitive region of the image sensing component being greater than an area of an actual imaging region of a single lens but less than a sum of areas of actual imaging regions of the plurality of lenses; and
 a plurality of optical switch components disposed between the plurality of lenses and the image sensing component corresponding to the plurality of lenses,
 wherein:
 the optical switch component is controlled to switch between an on state and an off state; and
 neighboring optical switch components corresponding to neighboring lenses having overlapping actual imaging regions are not turned on at a same time.

2. The camera module according to claim 1, wherein the plurality of lenses are arranged linearly.

3. The camera module according to claim 1, wherein the plurality of lenses are arranged in a matrix.

4. The camera module according to claim 1, wherein the neighboring lenses are directly imaged onto the image sensing component, and the actual imaging regions of the neighboring lenses are overlapped with each other.

5. The camera module according to claim 1, wherein in an image capturing operation, the plurality of optical switch components are controlled to be turned on sequentially and successively so as to be imaged sequentially and successively on the image sensing component.

6. The camera module according to claim 1, wherein in an image capturing operation, optical switch components corresponding to lenses with non-overlapping actual imaging regions are controlled to be turned on so as to be imaged simultaneously on the image sensing component.

7. The camera module according to claim 1, wherein the image sensing component is one of a charge-coupled device (CCD) and a complementary metal-oxide-semiconductor (CMOS) image sensor.

8. The camera module according to claim 1, wherein the optical switch component is a micro-electromechanical system (MEMS) shutter.

9. A mobile terminal, comprising:
the camera module according to claim 1; and
a processor configured to:
control the plurality of optical switch components to switch between the on state and the off state; and
control the neighboring optical switch components corresponding to neighboring lenses having overlapping actual imaging regions not to be turned on simultaneously.

10. The mobile terminal according to claim 9, wherein at least one of a front camera and a rear camera of the mobile terminal comprises the camera module.

11. The mobile terminal according to claim 9, wherein the plurality of lenses are arranged linearly.

12. The mobile terminal according to claim 9, wherein the plurality of lenses are arranged in a matrix.

13. The mobile terminal according to claim 9, wherein the neighboring lenses are directly imaged onto the image sensing component, and the actual imaging regions of the neighboring lenses are overlapped with each other.

14. The mobile terminal according to claim 9, wherein in an image capturing operation, the plurality of optical switch components are controlled to be turned on sequentially and successively so as to be imaged sequentially and successively on the image sensing component.

15. The mobile terminal according to claim 9, wherein in an image capturing operation, the optical switch component corresponding to the lens with no overlap in the actual imaging region is controlled to be turned on so as to be imaged simultaneously on the image sensing component.

16. The mobile terminal according to claim 9, wherein the image sensing component is one of a charge-coupled device (CCD) and a complementary metal-oxide-semiconductor (CMOS) image sensor.

17. The mobile terminal according to claim 9, wherein the optical switch component is a micro-electromechanical system (MEMS) shutter.

18. The mobile terminal according to claim 9, wherein an area of a photosensitive region of the image sensing component is greater than an area of actual imaging region of a single lens but less than a sum of the areas of actual imaging regions of the plurality of lenses.

19. The mobile terminal according to claim 18, wherein the actual imaging regions of the plurality of lenses have overlapping regions, thereby enabling compact lens arrangement to reduce internal space of the mobile terminal occupied by the plurality of lenses.

20. The mobile terminal according to claim 19, wherein:
the area of the photosensitive region of the image sensing component shared by the plurality of lenses is less than the sum of the areas of the actual imaging regions of the plurality of lenses, thereby reducing a total photosensitive region of the image sensing component, to thereby save the internal space of the mobile terminal and reduce cost;
the plurality of lenses include a main lens and a plurality sub-lenses;
in an image capturing operation, the controller is configured to:
call each of the plurality of lenses separately to capture images at corresponding angles;
turn on an optical switch component of a sub-lens with a tilted optical axis separately, such that the sub-lens is imaged on the image sensing component, to thereby realize images/videos with a select angle, including a top or bottom perspective capturing, without moving the mobile terminal;
call the main lens and each of the plurality of sub-lenses in sequence to capture images on the image sensing component, and then synthesize the captured images to obtain an ultra-wide-angle image; and
sequentially turn on or separately turn on optical switch components to call sub-lenses with tilted optical axes to thereby share a high-quality image sensing component with the main lens.

* * * * *